(12) United States Patent
Lin

(10) Patent No.: US 6,592,236 B1
(45) Date of Patent: Jul. 15, 2003

(54) FOLDABLE EMERGENCY HAMMER

(76) Inventor: Ming-Hsuan Lin, No. 29-2, Sec. 1, Tafeng Rd., Tantzu Hsiang, Taichung Hsien (TW)

( * ) Notice: Subject to any disclaimer, the term of this patent is extended or adjusted under 35 U.S.C. 154(b) by 0 days.

(21) Appl. No.: 10/126,722

(22) Filed: Apr. 19, 2002

(51) Int. Cl.$^7$ ................................................. B25B 23/18
(52) U.S. Cl. ...................... 362/119; 362/120; 362/253; 7/143; 7/165; 7/144
(58) Field of Search .......................... 7/100, 118, 143, 7/144, 148, 158, 166, 146, 147, 165; 362/109, 119, 120, 253

(56) References Cited

U.S. PATENT DOCUMENTS

| | | | | |
|---|---|---|---|---|
| 6,082,232 A | * | 7/2000 | Anderson et al. | 81/440 |
| 6,182,541 B1 | * | 2/2001 | Anderson et al. | 81/440 |
| 6,282,740 B1 | * | 9/2001 | Sobotka | 7/143 |
| 6,298,756 B1 | * | 10/2001 | Anderson et al. | 81/440 |
| 6,453,564 B1 | * | 9/2002 | Foley | 30/359 |
| 6,454,430 B1 | * | 9/2002 | Lin | 362/119 |

* cited by examiner

*Primary Examiner*—Sandra O'Shea
*Assistant Examiner*—Sharon Payne
(74) *Attorney, Agent, or Firm*—Brinks Hofer Gilson & Lione

(57) ABSTRACT

An emergency hammer includes a handle having front and rear ends, and first and second side faces extending therebetween. The first side face is formed with a seat-receiving chamber to receive a bit-holding seat that is formed with several bit-receiving grooves to receive several driving bits. First and second retaining seats are fixed on the first side face at two opposite sides of the seat-receiving chamber to detachably mount an operating tool therebetween. The operating tool has a handgrip and a tool element pivotally connected to the handgrip. An extension rod is pivoted to one of the retaining seats, and has a free end connected to a hammerhead. The second side face of the handle is formed with a lid-receiving chamber and a socket-receiving chamber which receives a socket. A cover lid is received in the lid-receiving chamber, and is pivoted to a chamber-confining wall portion of the second side face, and covers the lid-receiving chamber and the socket-receiving chamber.

6 Claims, 7 Drawing Sheets

US 6,592,236 B1

FOLDABLE EMERGENCY HAMMER

CROSS REFERENCE TO RELATED APPLICATION

This application is related to U.S. patent application Ser. No. 09/839,625 which was filed on Apr. 19, 2001.

BACKGROUND OF THE INVENTION

1. Field of the Invention

The invention relates to a foldable hammer, more particularly to a foldable hammer for use in an emergency.

2. Description of the Related Art

In the aforesaid co-pending application of the inventor, a foldable emergency hammer is disclosed to include a handle and a hammerhead that is attached to the handle and that has a striking end. The handle is elongated, and has a pivot end and a free end that defines a retention hole. The retention hole extends in a transverse direction relative to a longitudinal direction of the handle. An extension rod has a pivot end connected pivotally to the pivot end of the handle, a free end, on which the hammerhead is fixed, and an intermediate portion with an elongated blade opening that extends in the longitudinal direction. A lock unit locks the extension rod releasably at an unfolded position relative to the handle. The extension rod is rotatable relative to the handle to a folded position, when unlocked from the handle, such that the striking end of the hammerhead engages the retention hole in the free end of the handle, thereby reducing a total length of the hammer. In addition, a cutter is secured within the extension rod, and has a blade portion that is exposed from the blade opening in the extension rod.

SUMMARY OF THE INVENTION

The object of this invention is to provide a foldable emergency hammer for use in case of an emergency.

Accordingly, a foldable emergency hammer of the present invention includes an elongated handle, a plurality of workpiece-driving bits, a bit-holding seat, first and second retaining seats, a foldable operating tool, a hammerhead, an extension rod, and a retaining unit. The handle extends in a longitudinal direction, and has a rear end defining a retention hole that extends in a transverse direction relative to the longitudinal direction, a front end opposite to the rear end, and a first side face that extends between the front and rear ends and that is indented to form a seat-receiving chamber. The seat-receiving chamber extends in the longitudinal direction. The bit-holding seat is mounted detachably in the seat-receiving chamber, and is formed with a plurality of bit-receiving grooves which receive the workpiece-driving bits, respectively. The first and second retaining seats are aligned in the longitudinal direction, are fixed on the handle at opposite sides of the seat-receiving chamber, and project from the first side face in the transverse direction. The operating tool includes a handgrip that has two opposite ends detachably mounted on the first and second retaining seats so as to stack on the bit-holding seat, and a tool element pivoted to one of the opposite ends of the handgrip. The tool element includes a driver shank for connecting with a selected one of the workpiece-driving bits. The hammerhead has a striking end. The extension rod has a pivot end pivoted to the first retaining seat, and a free end opposite to the pivot end and on which the hammerhead is fixed. The extension rod is rotatable relative to the handle between a folded position, in which the extension rod is juxtaposed with the operating tool on the first side face, and the striking end of the hammerhead extends into and engages the retention hole in the rear end of the handle, and a non-folded position, in which the striking end of the hammerhead moves away from the retention hole and the extension rod extends in the longitudinal direction. The retaining unit releasably retains the extension rod at the folded and non-folded positions relative to the handle.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
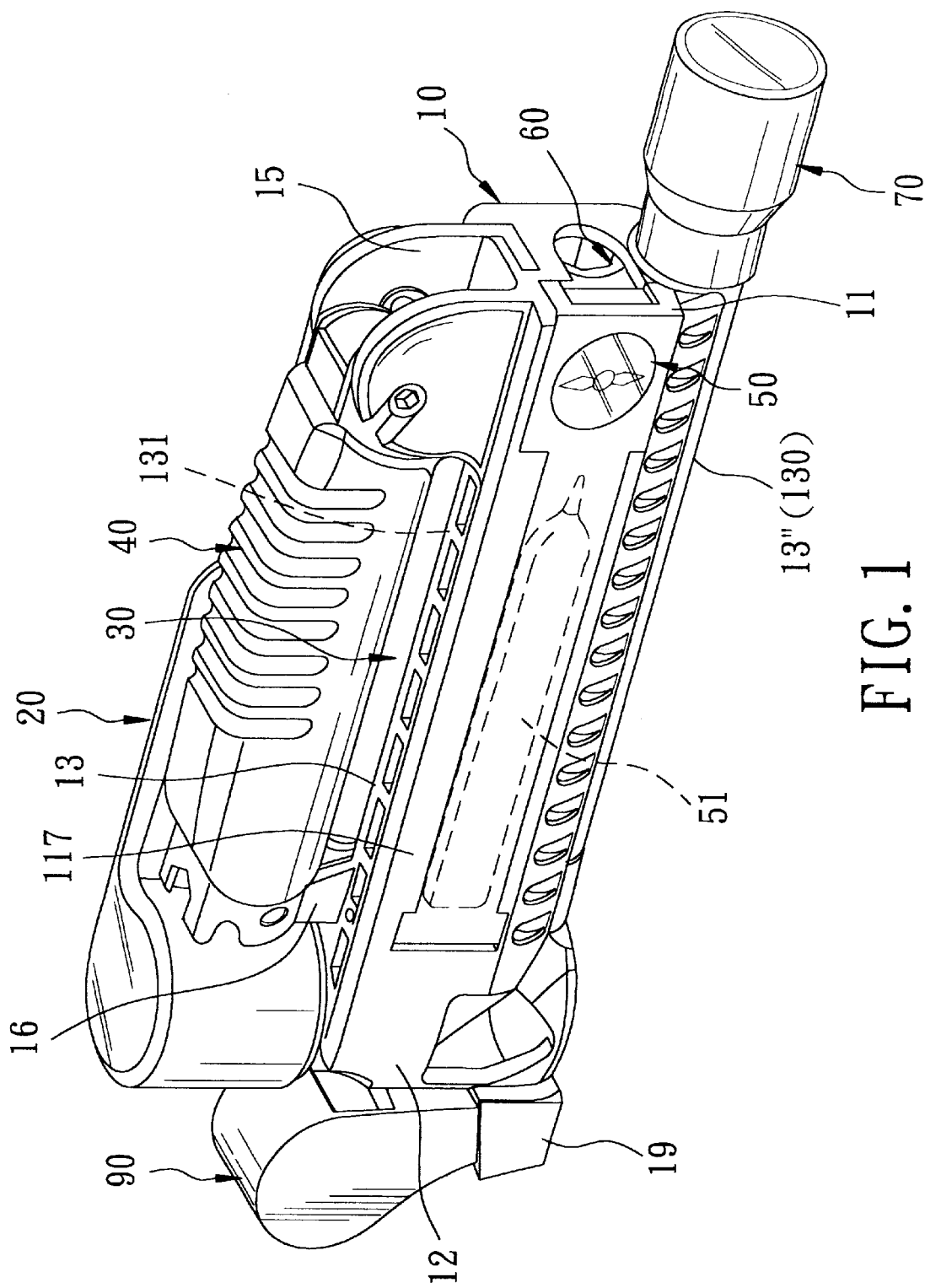
FIG. 1 is a perspective view of the preferred embodiment of a foldable emergency hammer according to the present invention.
Figure 2:
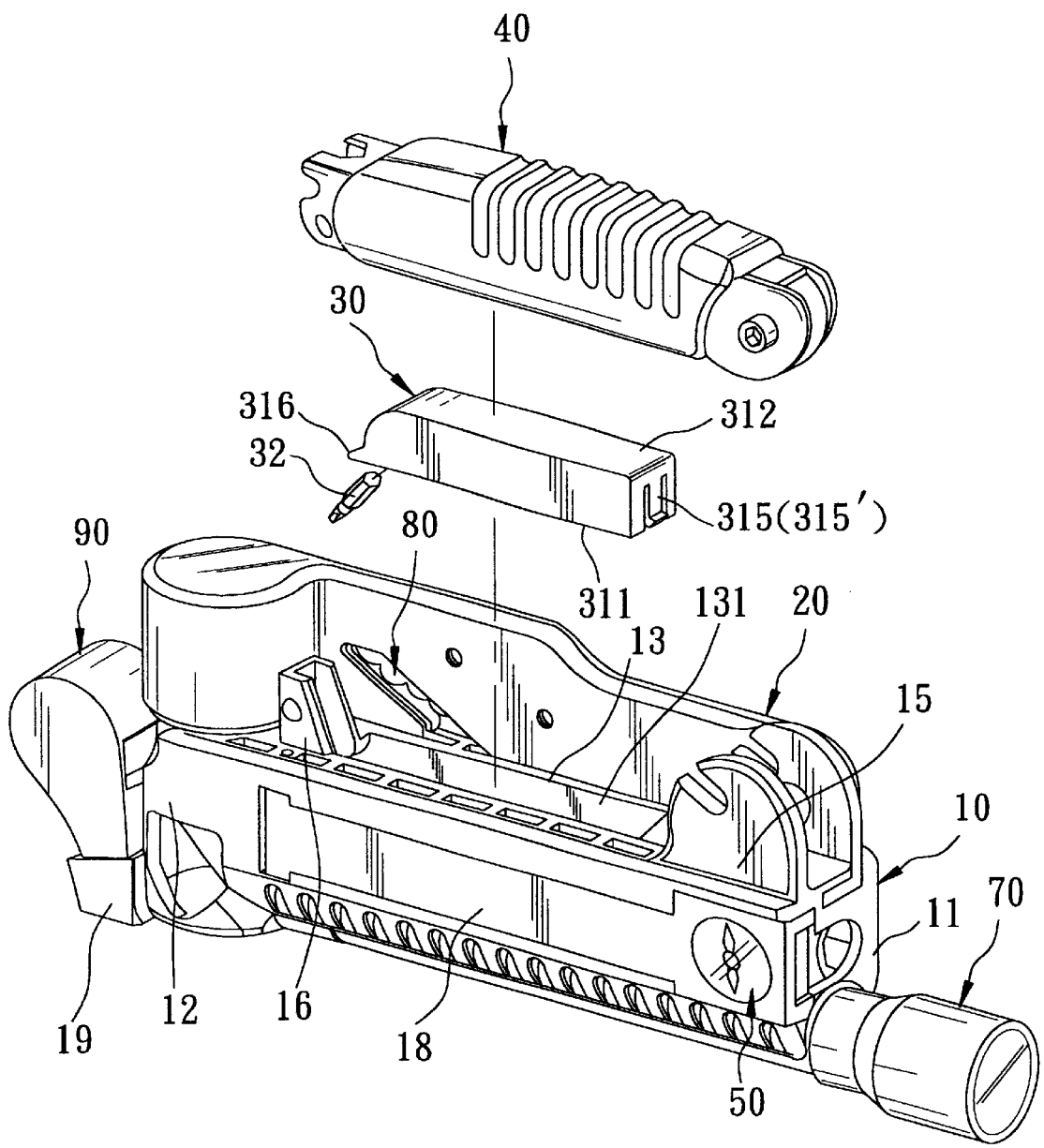
FIG. 2 is a perspective view of the preferred embodiment, in which a bit-holding seat and a foldable operating tool are removed to illustrate configuration of a seat-receiving chamber in a handle.
Figure 3:
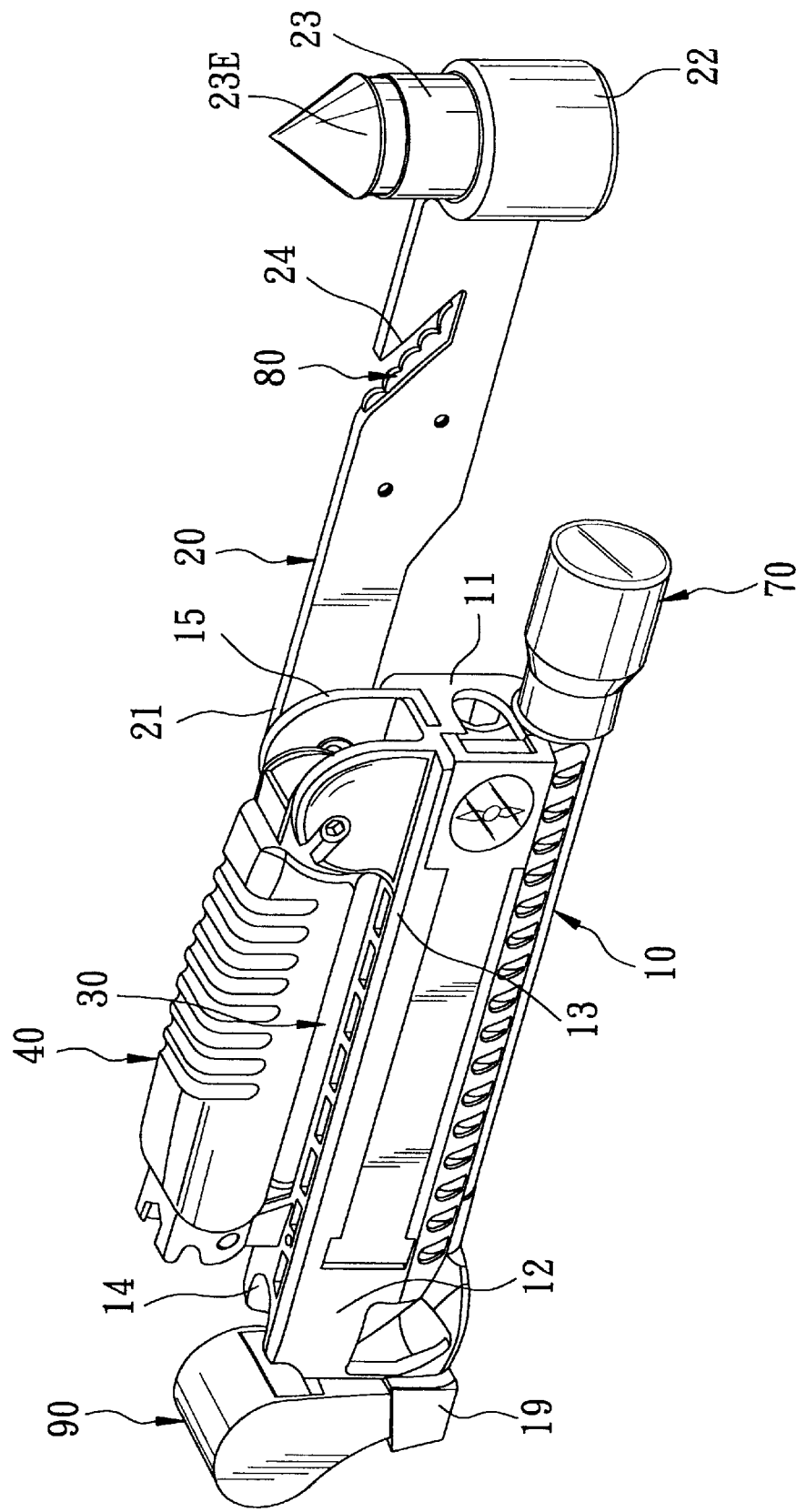
FIG. 3 is a perspective view of the preferred embodiment, illustrating a state when an extension rod is in a non-folded position relative to the handle.

Referring to FIGS. 1 to 3, the preferred embodiment of a foldable emergency hammer of the present invention is shown to include an elongated handle 10, a plurality of workpiece-driving bits 32, a bit-holding seat 30, first and second retaining seats 15, 16, a foldable operating tool 40, a hammerhead 23, an extension rod 20, and a retaining unit 17.

As illustrated, the handle 10 extends in a longitudinal direction, has a rear end 12 defining a retention hole 14 that extends in a transverse direction relative to the longitudinal direction, a front end 11 opposite to the rear end 12, and a first side face 13 that extends between the front and rear ends 11, 12 and that is indented to form a seat-receiving chamber 131. The seat-receiving chamber 131 extends along the longitudinal direction.

The bit-holding seat 30 is mounted detachably in the seat-receiving chamber 131, and is formed with a plurality of bit-receiving grooves 314 (see FIG. 6) which receive the workpiece-driving bits 32, respectively.

The first and second retaining seats 15, 16 are aligned in the longitudinal direction, are fixed on the handle 10 at opposite sides of the seat-receiving chamber 131, and project from the first side face 13 in the transverse direction.

Figure 7:
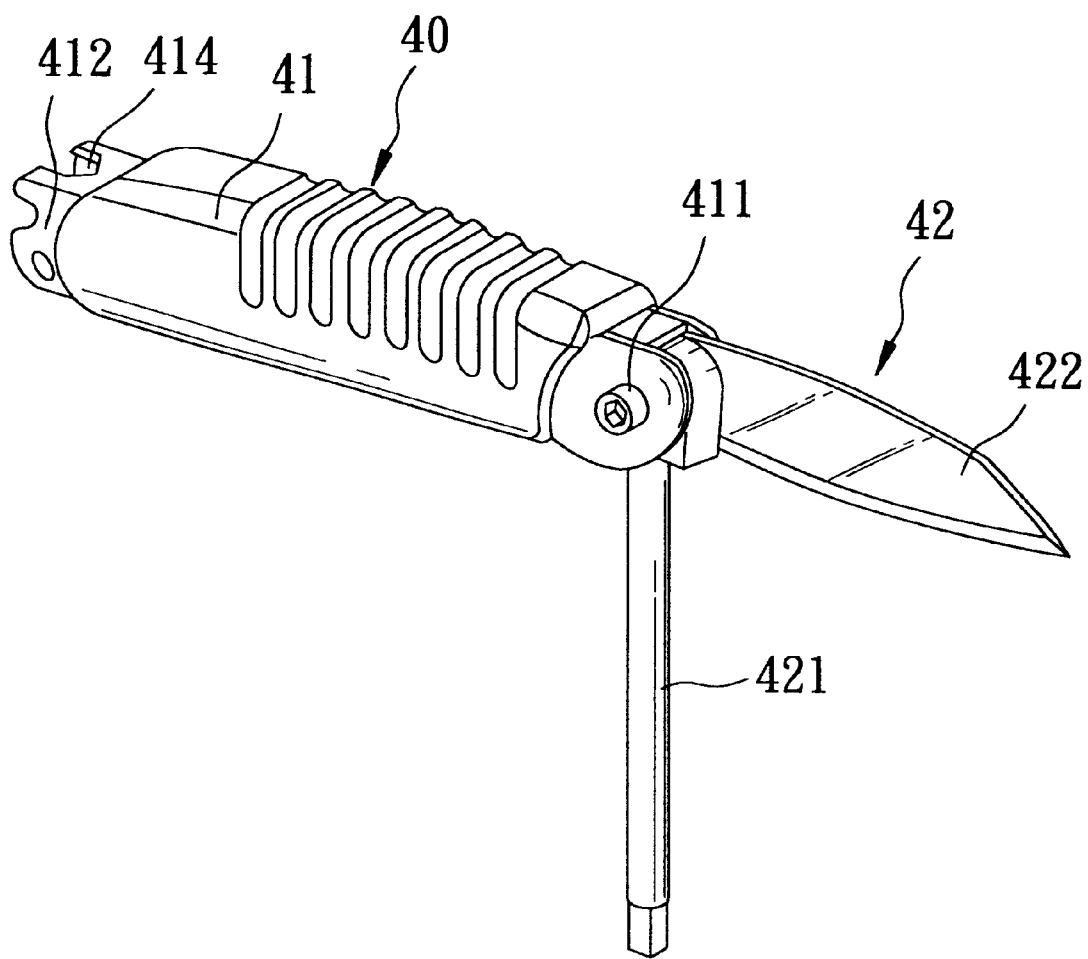
FIG. 7 is a perspective view of the operating tool with a driver shank and a cutting blade employed in the preferred embodiment.

The operating tool 40 includes a handgrip 41 that has two opposite ends 411, 412 (see FIG. 7) detachably and respectively mounted on the first and second retaining seats 15,16 so as to stack on the bit-holding seat 30, and a plurality of tool elements 42 pivoted to one of the opposite ends 411, 412 of the handgrip 41. The end 412 of the handgrip 11 is preferably formed with a nut-receiving notch 414 that is adapted to receive a hexagonal head of a bolt or a nut so that the operating tool 40 can serve as a flare nut spanner for tightening or loosening the bolt and the nut. In this embodiment, the tool elements 42 include a cutting blade 422 and a driver shank 421.

The extension rod 20 has a pivot end 21 pivoted to the first retaining seat 15, and a free end 22 opposite to the pivot end 21 and on which the hammerhead 23 is fixed in such a manner that a striking end 23E projects from the free end 22 in the transverse direction (see FIG. 3). The extension rod 20 is rotatable relative to the handle 10 between a folded position, in which the extension rod 20 is juxtaposed with the operating tool 40 on the first side face 13 (see FIG. 1) and the striking end 23E of the hammerhead 23 extends into and engages the retention hole 14 in the rear end 12 of the handle 10, and a non-folded position, in which the striking end 23E of the hammerhead 23 moves away from the retention hole 14 and the extension rod 20 extends in the longitudinal direction (see FIG. 3).

Figure 4:
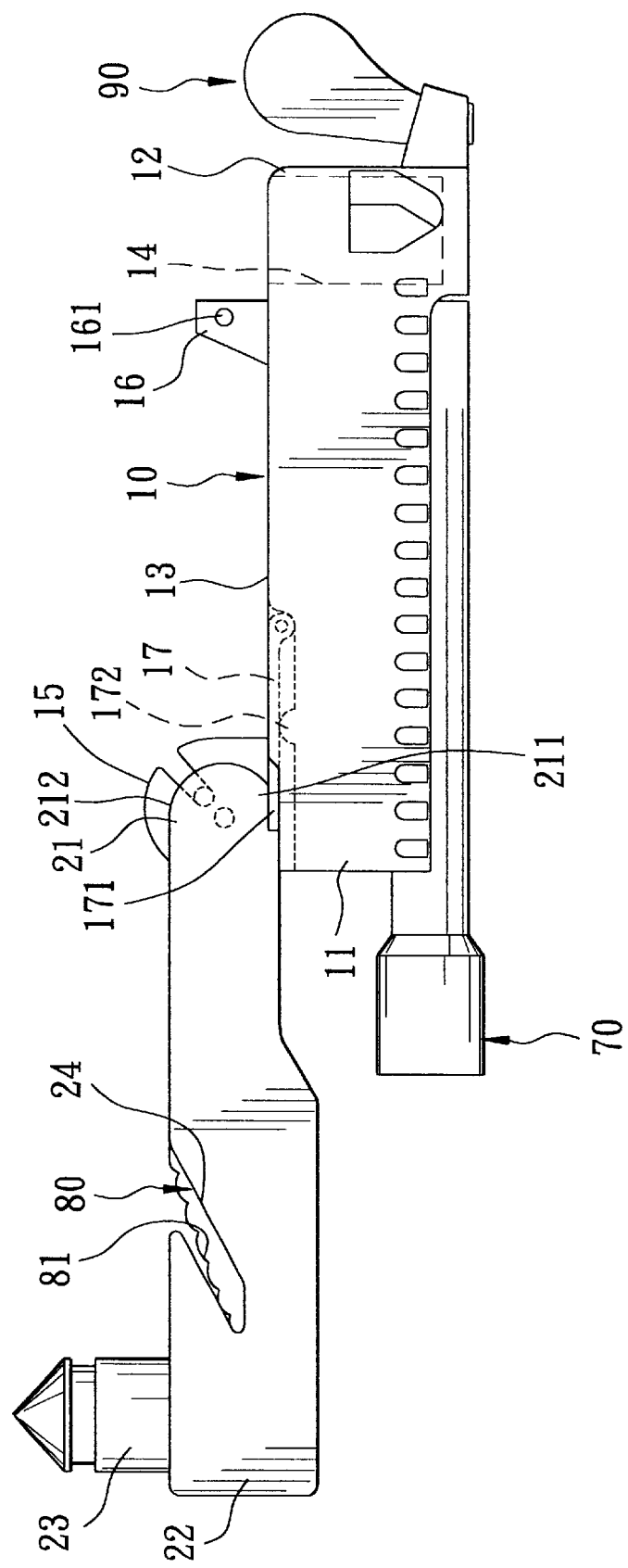
FIG. 4 is a lateral side view of the preferred embodiment, illustrating how the extension rod is retained at the non-folded position relative to the handle.

The retaining unit 17 (see FIG. 4) releasably retains the extension rod 20 at the folded and non-folded positions relative to the handle 10. Preferably, the first side face 13 of the handle 10 is further formed with a spring-receiving groove that is located adjacent to the first retaining seat 15, that extends in the longitudinal direction and that is confined by a groove-confining wall. The groove-confining wall has a protrusion 172 projecting therefrom in the transverse direction. The retaining unit 17 includes a spring plate 171 disposed in the spring-retaining groove, in constant contact with the pivot end 21 of the extension rod 20 and pivoted to the groove-confining wall in such a manner that the protrusion 172 serves a fulcrum and constantly pushes the spring plate 171 to urge the pivot end 21 of the extension rod 20 at a first side 211 of the pivot end 21 when the extension rod 20 is positioned at the non-folded position, and at a second side 212 of the pivot end 21 opposite to the first side 211 when the extension rod 20 is positioned at the folded position so as to prevent untimely rotation of the extension rod 20 from the folded position to the non-folded position.

The extension rod 20 further has an intermediate portion that extends between the pivot and free ends 21, 22 and that is formed with a blade-mounting notch 24. A knife 80 is fixed in the blade-mounting notch 24 in the extension rod 20 in such a manner that a blade 81 of the knife 80 is exposed from the blade-mounting notch 24 (see FIGS. 3 and 6).

Figure 6:
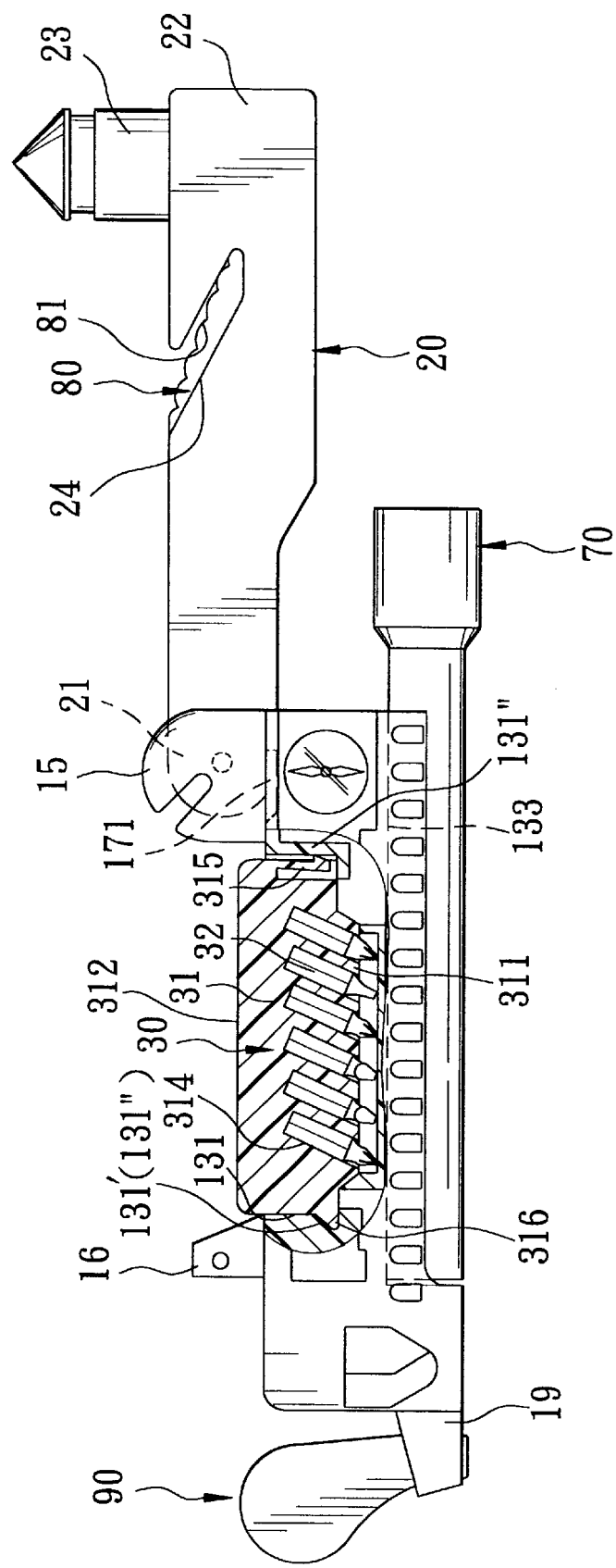
FIG. 6 is a lateral side view of the preferred embodiment, illustrating how the bit-holding seat is retained in the seat-receiving chamber formed in the handle.

Referring to FIG. 6, the handle 10 has a chamber-confining wall 131' confining the seat-receiving chamber 131, and formed with two opposite retaining recesses 131". The bit-holding seat 30 has two opposite ends 315, 316, a groove-forming portion 311 that extends between the opposite ends and that extends into the seat-receiving chamber 131, and that is formed with the bit-receiving grooves 314, a base portion 312 that extends from the groove-forming portion 311 in the transverse direction and that projects outwardly from the seat-receiving chamber 131, and a resilient engaging tongue 315' (see FIG. 2) projecting from one opposite end 315 of the bit-holding seat 30 for releasably engaging the right retaining recess 131" in the chamber-confining wall 131' while the other opposite end 316 of the bit-holding seat 30 is received in the left retaining recess 131" so as to prevent untimely removal of the bit-holding seat 30 from the seat-receiving chamber 131.

Figure 5:
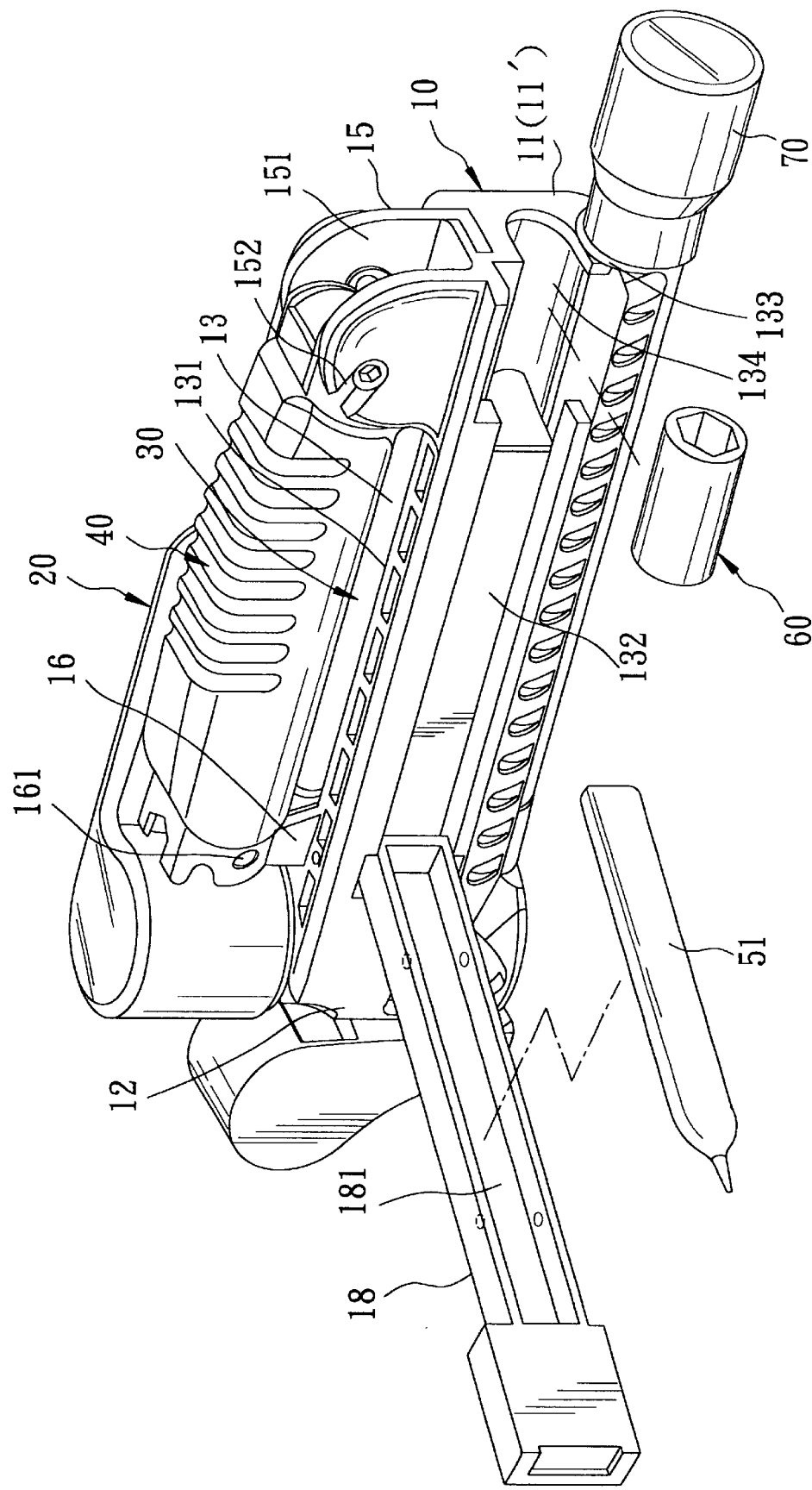
FIG. 5 is a perspective view of the preferred embodiment, illustrating how a pencil and a socket are kept in the handle.

Referring to FIGS. 1 and 5, the handle 10 further has a second side face 117 that extends between the front and rear ends 11, 12, that is adjacent to and perpendicular to the first side face 13, and that is indented to form a lid-receiving chamber 132 which extends in the longitudinal direction. A cover lid 18 is disposed in the lid-receiving chamber 132, and is pivoted to a chamber-confining wall portion of the second side face 117 of the handle 10 so as to cover the lid-receiving chamber 132. The cover lid 18 has an outer face flush with the second side face 117, an inner face that defines a pen-receiving chamber 181 to receive a pen 51 therein, and a free end. A compass 50 is fixed on the outer face at the free end of the cover lid 18. Preferably, the second side face 117 of the handle 10 is further indented to form a socket-receiving chamber 134 that is disposed adjacent to and frontwardly of the lid-receiving chamber 132. A socket 60 is disposed detachably in the socket-receiving chamber 134, and is disposed to be coupled with the driver shank 421 of the operating tool 40 (see FIG. 7) and a selected one of the workpiece-driving bits 32 (see FIG. 2). The free end of the cover lid 18 covers the socket-receiving chamber 134.

Referring once again to FIGS. 1 and 5, the front end 11 of the handle 10 has a front end face 11' that defines a notch 133. The handle 10 further has a third side face 13" opposite to the first side face 13. The third side face 13" is indented to form an elongated chamber 130 which is in spatial communication with the notch 133 and which cooperates with the notch 133 to define a light-receiving recess that extends in the longitudinal direction. A flashlight 70 with a head portion is detachably mounted in the light-receiving recess in such a manner that the head portion of the flashlight 70 is exposed from the notch 133 in the front end of the handle 10. The rear end 12 of the handle 10 is further provided with a whistle-holding element 19 for holding a whistle 90 therein (see FIG. 1).

With this invention thus explained, it is apparent that numerous modifications and variations can be made without departing from the scope and spirit of this invention. It is therefore intended that this invention be limited only as indicated in the appended claims.

I claim:
1. A foldable strikethrough hammer comprising:
an elongated handle extending in a longitudinal direction, having a rear end defining a retention hole that extends in a transverse direction relative to the longitudinal direction, a front end opposite to said rear end, and a first side face extending between said front and rear ends and indented to form a seat-receiving chamber that extends along the longitudinal direction;
a plurality of work-piece driving bits;
a bit-holding seat mounted detachably in said seat-receiving chamber and formed with a plurality of bit-receiving grooves which receive said workpiece-driving bits, respectively;
first and second retaining seats aligned in the longitudinal direction, fixed on said handle at opposite sides of said seat-receiving chamber, and projecting from said first side face in the transverse direction;
a foldable operating tool including a handgrip that has two opposite ends detachably and respectively mounted on said first and second retaining seats so as to stack on said bit-holding seat, and a tool element pivoted to one of said opposite ends of said handgrip, said tool element including a driver shank for connecting with a selected one of said workpiece-driving bits;
a hammerhead having a striking end;
an extension rod having a pivot and pivoted to said first retaining seat, and a free end opposite to said pivot end and on which said hammerhead is fixed, said extension rod being rotatable relative to said handle between a folded position, in which said extension rod is juxtaposed with said operating tool on said first side face and said striking end of said hammerhead extends into and engages said retention hole in said rear end of said handle, and a non-folded position, in which said striking end of said hammerhead moves away from said retention hole and said extension rod extends in the longitudinal direction; and a retaining unit for releasably retaining said extension rod at said folded and non-folded positions relative to said handle.

2. The foldable emergency hammer as defined in claim 1, wherein said extension rod further has an intermediate portion that extends between said pivot and free ends and that is formed with a blade-mounting notch, said emergency hammer further comprising a knife fixed in said blade-mounting notch in said extension rod.

3. The foldable emergency hammer as defined in claim 1, wherein said elongated handle has a chamber-confining wall confining said seat-receiving chamber and formed with two opposite retaining recesses, said bit-holding seat having two opposite ends, a groove-forming portion that extends between said opposite ends of said bit-holding seat, that extend into said seat-receiving chamber and that is formed with said bit-receiving grooves, a base portion extending from said groove-forming portion in the transverse direction and projecting outwardly from said seat-receiving chamber, and a resilient engaging tongue projecting from one of said opposite ends of said bit-holding seat for releasably engaging a respective one of said retaining recesses in said chamber-confining wall so as to prevent untimely removal of said bit-holding seat from said seat-receiving chamber.

4. The foldable emergency hammer as defined in claim 3, wherein said elongated handle further has a second side face that extends between said front and rear ends, that is adjacent to and perpendicular to said first side face, and that is indented to form a lid-receiving chamber which extends in the longitudinal direction and that has a chamber-confining wall portion confining said lid-receiving chamber, said emergency hammer-further comprising a cover lid pivotally mounted to said chamber-confining wall portion of said second side face so as to be received in said lid-receiving chamber and having an outer face that is flush with said second side face, an inner face defining a pen-receiving chamber, and a free end, said emergency hammer further comprising a pen detachably mounted in said pen-receiving chamber in said cover lid, and a compass fixed on said outer face at said free end of said cover lid.

5. The foldable emergency hammer as defined in claim 4, wherein said second side face of said elongated handle is further indented to form a socket-receiving chamber that is disposed adjacent to and frontwardly of said lid-receiving chamber, said emergency hammer further comprising a socket disposed detachably in said socket-receiving chamber and disposed to couple with said driver shank in said operating tool and a selected one of said workpiece-driving bits, said free end of said cover lid covering said socket-receiving chamber.

6. The foldable emergency hammer as defined in claim 5, said elongated handle further has a third side face opposite to said first side face, said third side face being indented to form an elongated chamber, said front end having a front end face that defines a notch in spatial communication with said elongated chamber and cooperating with said elongated chamber to define a light-receiving recess which extends in the longitudinal direction, said emergency hammer further comprising a flashlight with a head portion detachably mounted in said light-receiving recess in such a manner that said head portion of said flashlight is exposed from said notch in said front end of said handle.

\* \* \* \* \*